April 29, 1930.  E. G. PARKER  1,756,133
RELIEF VALVE
Filed June 5, 1926
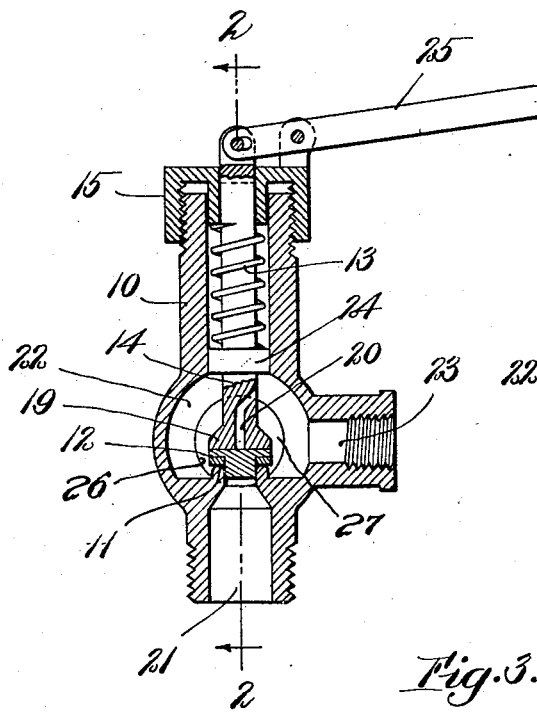
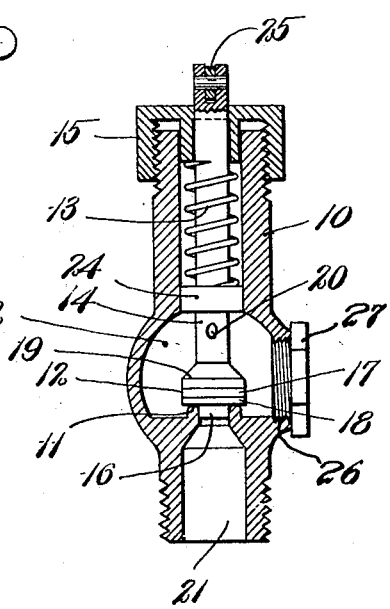
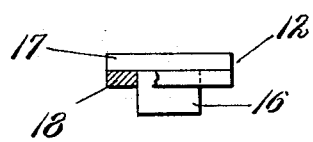
Inventor:
Ernest G. Parker
by Edward F. Allen
atty.

Patented Apr. 29, 1930

1,756,133

UNITED STATES PATENT OFFICE

ERNEST G. PARKER, OF NEW BEDFORD, MASSACHUSETTS

RELIEF VALVE

Application filed June 5, 1926. Serial No. 113,866.

This invention relates to a relief valve such as may be used in connection with domestic boilers, gas water heaters and the like.

It is an object of the present invention to provide an adjustable relief valve, wherein a fusible plug is used, with means to readily insert a new plug when a plug has fused.

It is a further object of the invention to so arrange a relief valve having a fusible plug valve therein that a new plug may be inserted into the valve body without disturbing the predetermined setting of the pressure desired or required to hold the plug valve on its seat.

Another object of the invention is to provide a combined fusible plug and valve member having an aperture sealing portion thereon, which may be readily inserted into the body of a valve thus simultaneously providing a fusible plug and a new valve seat contact member.

A still further object of the invention is to provide a simple and inexpensive combined fusible plug and valve member which is devoid of means to secure it to other portions of the valve as generally arranged, and which is a separate part but arranged to be normally held in place by a spring pressed plunger, and therefore removable from the valve body if need be, and readily inserted thereinto for the purpose of replenishment without disturbing the predetermined pressure regulation of the said spring or the employment of skilled labor.

Other objects of the invention will be fully understood from a description of the drawing and the claim hereinafter given.

Of the drawing:

Figure 1 represents a vertical section through a relief valve embodying the invention.

Figure 2 is a section on the line 2—2 Figure 1.

Figure 3 is an enlarged view of the combined fusible plug and valve member partially broken away.

Like characters represent like parts throughout the several figures of the drawing.

The drawing herewith illustrates a simple and inexpensive relief valve wherein the body 10 has a valve seat 11 arranged to be normally occupied by a combined fusible plug and valve member 12 and which is held thereon by the spring 13 acting on the collar on the plunger 14.

The said spring 13 is adjustable as to the pressure it may exert on the said plunger by reason of its contact with the cap 15 which is internally threaded to engage threads on the valve body so that turning the said cap in one way or the other increases or decreases the spring pressure on the plunger as the case may be and consequently on the plug valve member.

In the present instance the plug valve member 12 is composed of fusible metal having a cylindrical shank portion 16 and a flange 17 underneath which is a washer 18 of suitable material adapted to form a seal for the valve at the seat thereof and is preferably of a material not affected by heat.

The plunger 14 has an enlarged lower end 19 of approximately the diameter of the said valve member 12, and is bored as at 20 to form a passage from the inlet 21 to the hollow portion or chamber 22 of the body 10 and thence to the outlet 23 in the event that the plug should fuse, but normally the bore 20 is closed by the fusible valve 12 as seen in Figure 1 of the drawing.

The said plunger 14 has a collar 24 thereon against which the spring 13 exerts its pressure, and it extends upwardly through a hole in the cap 15, its outer end being arranged to receive the end of a lever 25 pivoted in lugs upstanding from the said cap.

From the foregoing it will be readily seen that downward pressure on the free end of the lever 25 will cause the plunger 14 to be lifted so that access may be had to the valve member 12, or to the valve seat 11 through a hole or access port 26 in the side of the body 10 which is normally closed by a screw plug 27 preferably operable by hand.

It will be understood that in valves of this class it is customary to regulate the pressure of the spring for the particular use of the valve before it leaves the factory, and for best results this predetermined setting of the pressure should not be changed or tampered with.

It is a feature of the present invention to so arrange the valve proper that the setting of the pressure is not disturbed when a new plug valve and member are to be inserted into the body of the valve, and in fact the use of tools to make the change is not necessary as with the present construction the screw plug 27 is arranged to be removed by hand, said plug 27 normally serving as a closure for the access port 26 which latter is disposed upon the outlet side of seat 11 and at the side of the body opposite the fusible valve 12.

As will be clear from the above description the spring pressed plunger 14 has abutting engagement with the separable fusible valve 12 to hold the latter on its seat and when said valve is destroyed by being fused it is possible to pass a new fusible valve into position by removing the closure plug 27, pressing down upon the lever 25, and inserting a new fusible valve through the access port 26; placing it in its proper position upon the seat 11, after which the closure plug 27 is returned to its normal position.

The valve shown in the drawing is arranged to be lifted from its seat at a predetermined pressure at the inlet 21 which action permits water or even steam, below a certain temperature, to pass into the hollow portion 22 and out through the passage 23.

In the event that heat is generated to a degree above the fusing point of the plug 12, the said plug will fuse and the bore 20 will be opened to allow the excess heat to escape through the outlet 23.

It is not known that a relief valve has ever been made having provision therein to receive a combined fusible plug valve member without disturbing the predetermined setting of the spring pressure, or wherein a fusible plug having a washer arranged therewith as a valve seat contact means has been applied to its position without the aid of securing means of one sort or another.

In view of the above it is not the intention to limit the invention to the precise construction and arrangement shown as changes might be made therein without departing from its spirit and scope.

Having described the invention I claim:

A relief valve of the class described comprising a body portion having a chamber therein; a valve seat in said chamber; a valve member comprising a plug of fusible metal having a valve seat contact washer thereon, said valve member being loosely mounted on said seat; a spring pressed plunger arranged to normally retain said valve member on said seat; said chamber having an inlet and an outlet, and a normally closed passage in which said plunger is located; said plunger having a passage therein leading into said chamber and normally closed to said inlet by said valve member; said body portion having a normally closed aperture therein through which a valve member may be passed to occupy its position on said seat when said valve is in assembled condition; and means to release said valve retaining plunger when a valve member is to be inserted into said body portion.

Signed by me at New Bedford, Massachusetts, this 25th day of May, 1926.

ERNEST G. PARKER.